INVENTOR
JACOB VAN WILGEN
BY
AGENT

United States Patent Office 2,897,837
Patented Aug. 4, 1959

2,897,837

DEVICE FOR DRAWING STERILIZED LIQUIDS FROM A VESSEL

Jacob van Wilgen, Eindhoven, Netherlands, assignor, by mesne assignments, to North American Philips Company, Inc., New York, N.Y., a corporation of Delaware Application December 6, 1955, Serial No. 551,430

Claims priority, application Netherlands December 16, 1954

5 Claims. (Cl. 137—591)

The present invention relates to improvements relating to devices for drawing sterilized liquids from a receptacle or vessel.

Devices for sterilizing liquids have been developed for hospitals where sterile water or so-called physiological salt solutions are used. Sterilization may, for example, be effected by irradiation with ultra-violet light.

Regardless of whether said devices are intended for treating a given quantity of liquid or for supplying the liquid at any desired instant and in a continuous stream, for example the device suggested in my co-pending United States patent application, Ser. No. 493,989 filed March 14, 1955, now Patent No. 2,857,520, granted Oct. 21, 1958, they invariably comprise a vessel from which the liquid is caused to flow to the required spot by opening an outlet.

An object of the present invention is to improve devices for drawing sterile liquids from a vessel which may be either a container to which the liquid is supplied from a sterilizer or a vessel which itself encloses the sterilization device.

I have found that, under certain conditions, the first liquid drawn off is not sterile on account of impurities in the discharge duct. Even if this duct has previously been sterilized, the liquid drawn off may contain bacteria if, on filling the vessel in which sterilization is carried out, the liquid first reaching the outlet opening has not been exposed to the bacteria-killing effect for a sufficient time. Said nonsterile liquid infects the discharge duct. It is also possible that the liquid in the sterilizer is infected by it as soon as said liquid is no longer exposed to the bacteria-killing effect, for example due to interruption of the heating operation or the irradiation with ultra-violet light.

Sometimes, this disadvantage, which is inherent in sterilizers, can be avoided by filling the vessel slowly. Particularly, the device described in my aforesaid co-pending United States patent application Ser. No. 493,989 filed March 14, 1955, is constructed in such manner that said expedient is deemed reliable.

The improvement according to the invention permits the sterilizer to be filled rapidly without risking insufficient sterilization of the liquid drawn off initially.

In accordance with the invention the vessel comprises a tube which leads to the outlet opening and has a rising portion. In this rising portion, the air is compressed by the hydrostatic pressure in filling the vessel. It has such a length that the liquid level in the tube does not reach its highest points as long as the outlet opening is closed.

The larger the volume, between the upwardly directed tube and the cock, the greater should be the capacity of the upwardly directed duct itself. If the first-mentioned volume is sufficiently small it is sufficient to use an L-shaped tube, one leg of which is downwardly directed and the other leg of which is secured to the wall of the vessel.

If, when using an L-shaped tube, the outlet opening in the wall of the vessel would be located too far above the bottom, a tube may be employed, which comprises a downwardly directed portion between an upwardly directed portion and the outlet opening, so that the liquid level may rise to above the outlet opening.

The last-mentioned form is also suitable for use in a vessel acting only as a container, since this permits a disinfectant to be introduced into the discharge tube from without through the cock, so that the discharbe tube can be sterilized without the disinfectant entering the possibly filled container. If said disinfectant is a liquid it is advantageous to make the downwardly directed portion of the tube entirely or partly from transparent material. An observation window in the wall of the vessel then permits one to observe whether a sufficient quantity of disinfectant has been introduced while said liquid can be prevented from flowing over into the vessel itself.

In the case of a vessel which itself encloses the sterilizer it will be advisable for the upwardly directed portion of the tube, inasmuch as it becomes filled with liquid on filling the vessel with the discharge duct closed, to be made from a material which is sufficiently transparent to the sterilizing radiation.

In a suitable form, the tube used in accordance with the invention has a horizontal portion, one end of which leads to the outlet opening, whereas its other end merges into a U-shaped portion which is open at its lower end.

In order that the invention may be readily carried into effect, it will now be described by way of example with reference to the accompanying drawing, in which.

Figure 1:
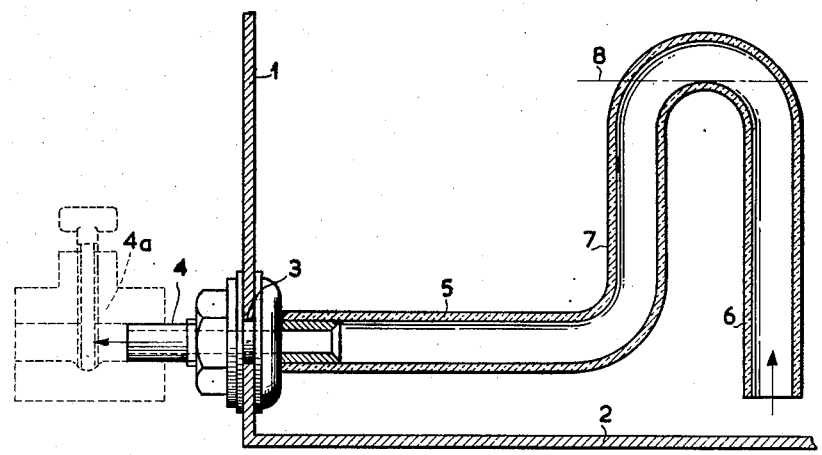
Fig. 1 is a schematic diagram, partly in section, of an embodiment of the discharge duct of the present invention.

In Fig. 1, a portion of the upright wall of the receptacle or vessel is denoted by 1 and a portion of its bottom by 2, both portions being shown in cross-section in planes at right angles to the wall. A cock 4a may be screwed into an auxiliary member 4 arranged in an opening 3 of the wall. On the auxiliary member 4 is provided a tube 5 of quartz or glass which is transparent to ultra-violet light. As shown in the drawing, said tube comprises an upwardly directed portion 6, a downwardly directed portion 7 and a horizontal portion.

In the tube 5 and, as the case may be, the portion of the duct possibly present between the auxiliary member 4 and the cock 4a, the air, on filling the vessel, is compressed by the liquid rising in the end of the upwardly directed portion 6 of the tube 5. The portion 6 should have such a predetermined length that if the vessel is completely filled (after which an overflow becomes operative or the supply is interrupted automatically), the liquid has not yet reached the level indicated in broken lines 8, so that no liquid flows into the horizontal portion or the tube. After a lapse of time, sufficient to sterilize also the liquid having entered to the rising portion 6, the cock 4a may be opened.

If the vessel is empty or at least the tube 5 not filled, the discharge duct can be disinfected by causing a suitable liquid to penetrate from without into the tube 5, the supply being so controlled by observation through a window provided in the wall 1 that the liquid in the portion 7 remains below the level indicated in broken lines 8, hence it does not flow into the vessel. The tapping system may subsequently be rinsed with other liquids, of which no large quantities are required. Instead of using liquids it is possible to use gases or vapors, for example, steam for sterilizing the discharge duct.

It will be obvious that the device in accordance with the invention is only intended for vessels from which the air above the liquid is allowed to escape in filling. The larger the capacity of the discharge duct up to the point where it is closed, and the smaller the cross-sectional area of the rising portion 6, the higher will the liquid in said portion rise on filling the vessel. In order to limit the height of rise, the portion in at least a part thereof may be made considerably wider than the remaining part of the tube. In the case of a tube made from vitreous material, glass or quartz, said widening is easily obtained by making the portion 6 spherical.

Figure 2:
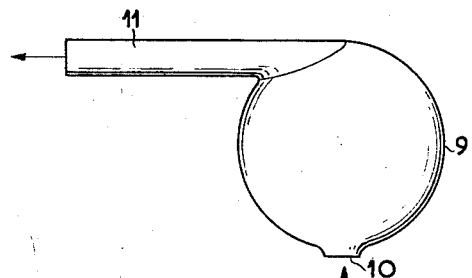
Fig. 2 is a schematic diagram of another embodiment of the discharge duct of the present invention which is made from vitreous material and with a comparatively long discharge duct.

A tube having a spherical portion is shown in Fig. 2. The glass bulb 9 constituting the rising portion comprises an inlet opening at 10 and a discharge tube 11 sealed at the top.

Figure 3:
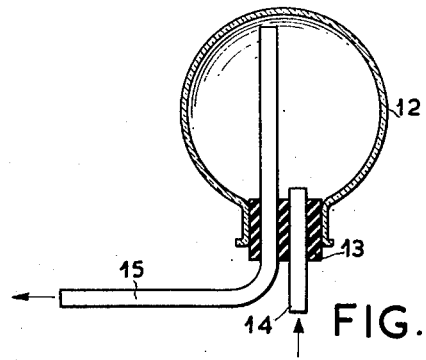
Fig. 3 is a schematic diagram, partly in section, of still another embodiment of the discharge duct of the present invention which is made from vitreous material.

In Fig. 3, a glass vessel 12 shown in cross-section is closed at its bottom end by means of a perforated plug 13, for example made from rubber, through which passes a tube 14 for the supply and a tube 15 for drawing off of the liquid. The tube 15, which extends short of the upper wall of the vessel 12, has the same function as the portion 7 of Fig. 1.

While the invention has been described by means of specific examples and in specific embodiments, I do not wish to be limited thereto, for obvious modifications will occur to those skilled in the art without departing from the spirit and scope of the invention.

What is claimed is:

1. A discharge duct for drawing sterilized liquids from a receptacle, comprising valve means for closing and opening said discharge duct and a tube joined to said valve means and having part thereof in said receptacle, said part comprising an upwardly directed portion of predetermined length, a downwardly directed portion positioned between said upwardly directed portion and said valve means and a substantially horizontal portion between said downwardly directed portion and said valve means, said predetermined length having a magnitude such that, starting with said tube filled with air, the air pressure in said tube maintains the liquid therein below the highest point in said upwardly directed portion when said valve means is closed and said receptacle is filled with liquid above said highest point.

2. A discharge duct for drawing sterilized liquids from a receptacle, comprising valve means for opening and closing said discharge duct and a tube joined to said valve means and having part thereof in said receptacle, said part comprising an upwardly directed portion of predetermined length, a downwardly directed portion positioned between said upwardly directed portion and said valve means, said downwardly directed portion being comprised in at least a part thereof of light transparent material, and a substantially horizontal portion between said downwardly directed portion and said valve means, said predetermined length having a magnitude such that, starting with said tube filled with air, the air pressure in said tube maintains the liquid therein below the highest point in said upwardly directed portion when said valve means is closed and said receptacle is filled with liquid above said highest point.

3. A discharge duct for drawing sterilized liquids from a receptacle, comprising valve means for opening and closing said discharge duct and a tube joined to said valve means and having part thereof in said receptacle, said part comprising an upwardly directed portion of predetermined length, said upwardly directed portion being comprised in at least a part thereof of ultra violet light transparent material, a downwardly directed portion positioned between said upwardly directed portion and said valve means and a substantially horizontal portion between said downwardly directed portion and said valve means, said predetermined length having a magnitude such that, starting with said tube filled with air, the air pressure in said tube maintains the liquid therein below the hightest point in said upwardly directed portion when said valve means is closed and said receptacle is filled with liquid above said highest point.

4. A discharge duct for drawing sterilized liquids from a receptacle, comprising valve means for opening and closing said discharge duct and a tube joined to said valve means and having part thereof in said receptacle, said part comprising an upwardly directed portion of predetermined length, a downwardly directed portion positioned between said upwardly directed portion and said valve means and a substantially horizontal portion between said downwardly directed portion and said valve means, said upwardly directed portion having in at least a part thereof a cross-sectional area relatively greater than that of the remainder of said tube, said predetermined length having a magnitude such that, starting with said tube filled with air, the air pressure in said tube maintains the liquid therein below the highest point in said upwardly directed portion when said valve is closed and said receptacle is filled with liquid above said highest point.

5. A discharge duct for drawing sterilized liquids from a receptacle, comprising valve means for opening and closing said discharge duct and a tube of vitreous material joined to said valve means and having a part thereof in said receptacle, said part comprising an upwardly directed portion of substantially spherical configuration, a downwardly directed portion positioned between said upwardly directed portion and said valve means and a substantially horizontal portion between said downwardly directed portion and said valve means, said spherical configuration having a diameter of a magnitude such that, starting with said tube filled with air, the air pressure in said tube maintains the liquid therein below the highest point in said upwardly directed portion when said valve is closed and said receptacle is filled with liquid above said highest point.

References Cited in the file of this patent
UNITED STATES PATENTS

| | | |
|---|---|---|
| 568,620 | Linstrom | Sept. 29, 1896 |
| 1,084,753 | Owens | Jan. 20, 1914 |
| 1,661,202 | Thayer | Mar. 6, 1928 |
| 1,762,533 | Shield | June 10, 1930 |
| 2,089,303 | Sica | Aug. 10, 1937 |